United States Patent [19]
Yao et al.

[11] Patent Number: 5,802,243
[45] Date of Patent: Sep. 1, 1998

[54] TIME EXPANSION METHOD AND SYSTEM FOR SLOWER THAN REAL-TIME PLAYBACK WITH VIDEO CASSETTE RECORDERS

[75] Inventors: Bingwei Yao, Shiroyama, Japan; Eldon A. Corl, San Carlos, Calif.

[73] Assignee: Entertainment Made Convenient (EMC3), Los Angeles, Calif.

[21] Appl. No.: 761,232

[22] Filed: Dec. 6, 1996

Related U.S. Application Data

[63] Continuation of Ser. No. 380,957, Jan. 31, 1995, abandoned.
[51] Int. Cl.$^6$ .................................................. H04N 5/78
[52] U.S. Cl. ...................... 386/78; 360/73.08; 360/70; 386/80
[58] Field of Search .................... 360/21, 32, 73.06, 360/73.07, 73.08, 70; 386/2, 6, 7, 34, 40, 47, 109, 67, 68, 74, 76, 78, 80, 81, 124, 112, 13, 14, 85, 86

[56] References Cited

U.S. PATENT DOCUMENTS

| | | | |
|---|---|---|---|
| 4,104,684 | 8/1978 | Wakami | 360/70 |
| 4,167,023 | 9/1979 | Bessette | 360/10.2 |
| 4,190,869 | 2/1980 | Ota | 360/10.2 |
| 4,473,850 | 9/1984 | Foerster et al. | 360/9.1 |
| 4,862,292 | 8/1989 | Enori | 360/9.1 |
| 5,210,663 | 5/1993 | Nakase | 360/10.3 |
| 5,335,116 | 8/1994 | Onishi et al. | 360/9.1 |
| 5,363,254 | 11/1994 | Sato | 360/73.08 |

OTHER PUBLICATIONS

*The Art of Digital Video* by John Watkinson ©1990 pp. 369–373.

Primary Examiner—W. R. Young
Assistant Examiner—Alan Faber
Attorney, Agent, or Firm—Thomas E. Schatzel; Law Offices of Thomas E. Schatzel A Prof. Corp.

[57] ABSTRACT

A video cassette recorder includes a tape transport and servo that records digital data at one tape speed and plays back the digital data at one twentieth of the recording speed, both with a fixed speed of rotation of a drum head. On playback, each recorded segment of data on the tape is read from ten slightly different longitudinal positions on the magnetic tape, with the highest amplitude read-back signal being selected. The drum head comprises two playback heads that each have playback widths that are approximately twice as wide as each of four recording heads in the drum head.

10 Claims, 4 Drawing Sheets

TIME EXPANSION METHOD AND SYSTEM FOR SLOWER THAN REAL-TIME PLAYBACK WITH VIDEO CASSETTE RECORDERS

This application is a continuation of application Ser. No. 08/380,957 filed on Jan. 31, 1995, now abandoned.

BACKGROUND OF THE INVENTION

1. Field of the Invention

The invention relates generally to magnetic recording and more specifically to time-expanding recording and playback with video cassette recorders (VCRs).

2. Description of the Prior Art

Video cassette recorders (VCRs) in the United States typically record and playback video programs at the same rate that ordinary television programming is broadcast. Many VCRs can receive and record National Television Standard Committee (NTSC) format broadcasts with built in VHF and UHF tuners. Later, the recorded program may be played back with a built-in VHF channel three (or four) modulator connected to a conventional television receiver. The "VHS" format is a ubiquitous cassette format in the United States, and VCRs compatible with VHS cassette tapes are widely available at low cost.

The tape transport and servo mechanism in a VHS-type VCR typically includes a capstan than regulates the tape speed as it is pulled spirally across a rotating drum recording/playback head. The tape contacts the drum head for approximately 180° of rotation. The video is thus recorded in a series of inclined segments which resemble the pattern made by diagonally parked cars along a street curb. An auxiliary head is used to record and playback an audio or a control track that runs linearly along one edge of the tape.

The speed and phase relationship between the drum head and the capstan are important. During playback, it is critical that the rotating playback head be controlled so that it tracks over the center of each recorded segment on the tape. The prior art has therefore increased and decreased both the drum head speed of rotation and the capstan speed to maintain their relative speeds.

In order to record video programs at rates higher than that of broadcasting, the prior art increases both the drum head rotation speed and capstan speed proportional to the increased rate of program input. Normal drum head and capstan speeds are then used during playback to deliver the program at the customary rate.

Conversely, in order to playback video programs at rates higher than that of broadcasting, the prior art increases both the drum head rotation speed and capstan speed proportional to the increased rate of program output. Normal drum head and capstan speeds are used during recording to accept the program at the customary rate.

VCRs are adept at recording and playing back digital information, which information may or may not represent a video program. Satellites and fiber-optic networks are capable of accepting and delivering digital data at exceptionally high rates. Such a wide bandwidth comes at a high cost, and it is expensive to use such channels to carry uncompressed data, e.g., ordinary television broadcasts. Therefore, the prior art has used video recorders to time-contract and time-expand video programming and digital data communication rates.

VHS-type VCRs use tape transports and servo mechanisms that are not easily modified to increase and decrease both their drum head rotation speeds and their capstan speeds. Making the capstan speed adjustable allows the use of otherwise ordinary transports and servos. But the playback becomes problematic because the path the playback head takes across the tape is inclined from the path the recording head takes across the tape during recording at a higher tape speed (assuming a constant drum head rotation speed). The prior art has offered no solution to this problem.

SUMMARY OF THE PRESENT INVENTION

It is therefore an object of the present invention to provide a recording system which uses a fixed drum head rotation speed and a plurality of tape capstan speeds to effectuate digital data time compression and expansion.

It is another object of the present invention to provide a method of recording and playing back digital data at input/output rates that are different.

Briefly, a system embodiment of the present invention comprises a video cassette recorder tape transport and servo that records digital data at one tape speed and plays back the digital data at one twentieth of the recording speed, both with a fixed speed of rotation of a drum head. On playback, each recorded segment of data on the tape is read several times, with the best read-back signal being selected. The drum head comprises two playback heads that each have playback widths that are almost twice as wide as each of four recording heads in the drum head.

An advantage of the present invention is that a digital data time-expansion system is provided that can utilize inexpensive and readily available video cassette tape transport and servo mechanisms.

A further advantage of the present invention is that a method is provided for using a fixed drum rotation speed in a video cassette recorder with a record capstan speed that substantially exceeds a playback capstan speed.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figure 1:
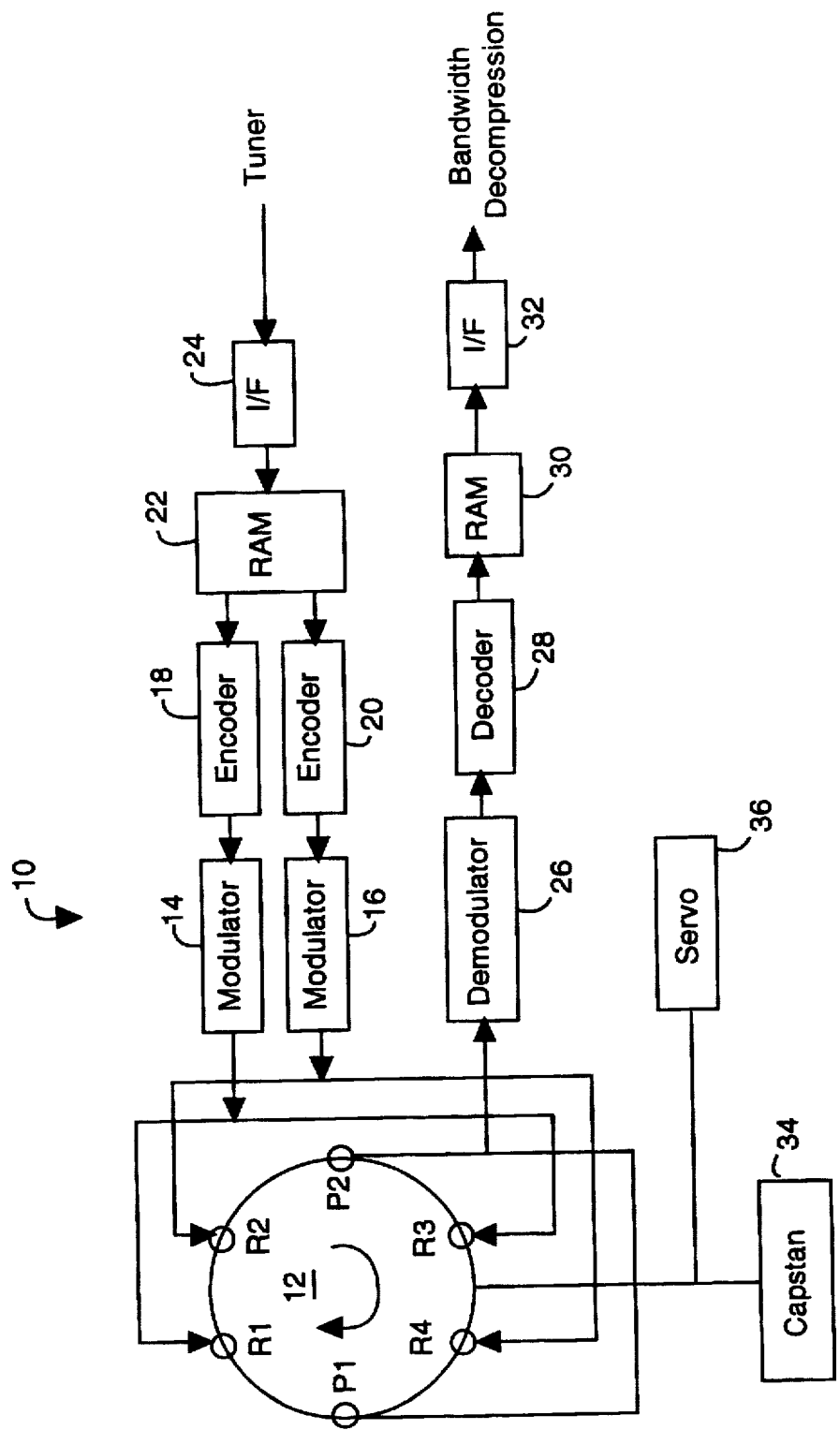
FIG. 1 is a block diagram of a video cassette recorder embodiment of the present invention.

FIG. 1 illustrates a video cassette recorder (VCR) embodiment of the present invention, referred to herein by the general reference numeral 10. The VCR 10 comprises two recording channels and a playback channel. These channels connect to a common fixed-rotation-speed drum head 12 with an axis of rotation that is angled with respect to the longitudinal of a moving magnetic tape. The VCR 10 thus provides for helical scan recording and playback of video images and sound. The drum head 12 has a plurality of recording heads (R1–R4) and playback heads (P1–P2)

connected to the respective channels. The two recording channels include a pair of modulators 14 and 16, a pair of encoders 18 and 20, a shared random access memory (RAM) 22 and an intermediate frequency (I/F) amplifier stage 24 for connection to a conventional television tuner. The encoders 18 and 20 preferably provide error checking and correcting (ECC) functions. The playback channel includes a demodulator 26, a decoder 28, a RAM 30 and an I/F stage 32 for connection to conventional bandwidth decompression. A digital to analog converter (DAC) may be used to convert the signal after bandwidth decompression to standard broadcast formats, e.g., in the United States, the "NTSC" format. Alternatively, an amplifier, equalizer, phase locked loop (PLL) and sync-recovery unit are included between the drum head 12 playback heads and the demodulator 26.

A conventional VHS-cassette tape transport and capstan mechanism is represented in FIG. 1 by a capstan 34 mechanically connected to the drum head 12 and a servo controller 36.

During operation, the VCR 10 records bar segments of digital information on magnetic tape. For example, such magnetic tape is pulled passed the drum head which is rotating at 1800 revolutions per minute (RPM) at a linear speed of 33.35 millimeters per second. This results in each recorded segment being tilted from the perpendicular to the length of the magnetic tape with sequential segments recorded side-by-side. If the magnetic tape has two recording heads placed 180° apart, then a tape contact of 180° of the circumference of the drum head 12 will allow every other recorded segment to be recorded by one recording head. By switching between the recording heads at appropriate times in relation to the contact of the heads with the tape, continuous video and audio recording is accommodated. By this technique, slower tape speeds may be realized to conserve on tape usage, while the higher relative head to tape speeds needed for recording video frequencies is provided. A longitudinally recorded control track is provided in the prior art to indicate with two binary states which head of two is active. In the VCR 10, such a control track is recorded with several alternating states per head transition to allow for control of the playback heads during times of exceptionally slow tape playback speeds. Otherwise, the control track transitions may drop below the minimum detectable playback frequency.

Figure 2:
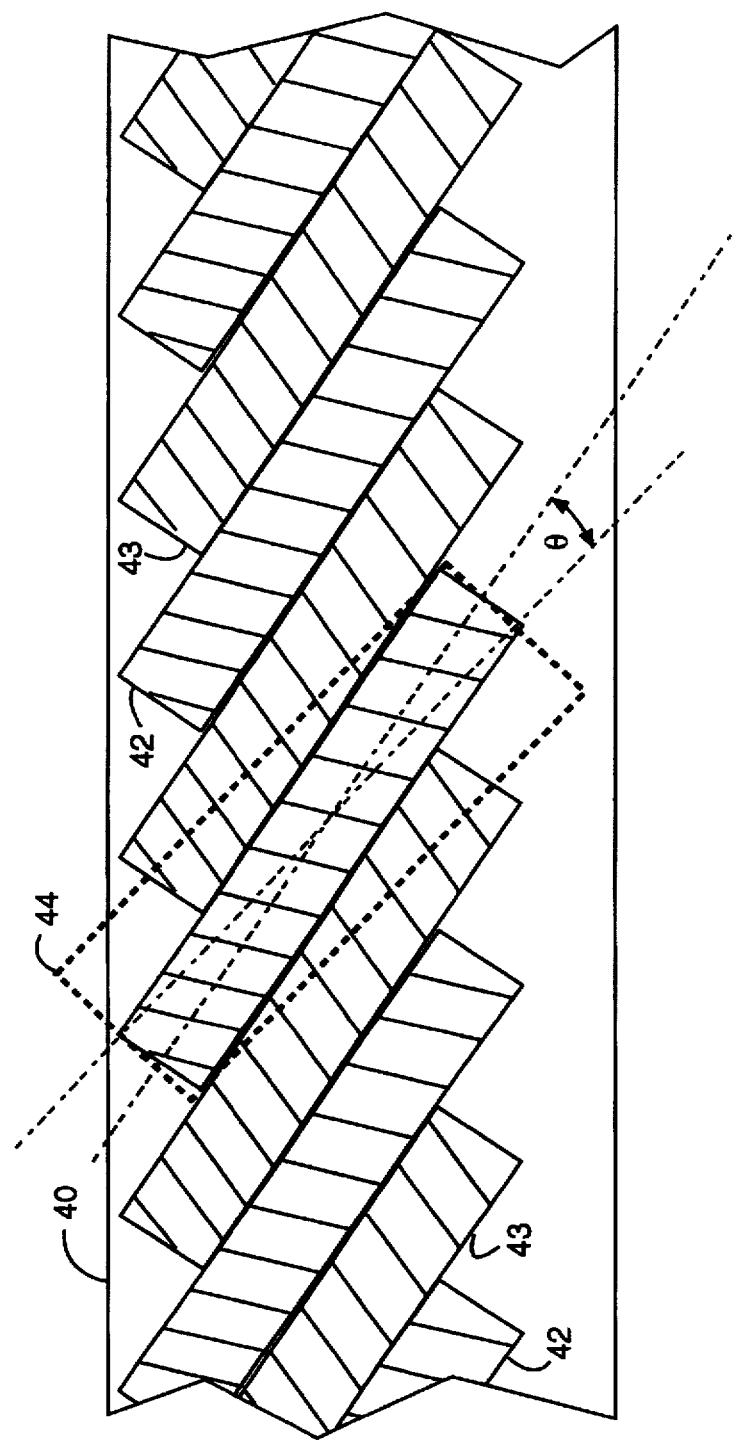
FIG. 2 is a diagram of a section of a magnetic tape showing the physical recording and playback patterns used in the VCR of FIG. 1.

During playback, a magnetic tape 40, a section of which is illustrated in FIG. 2, is drawn passed the rotating drum head 12 at one twentieth of its usual recording speed, e.g., 1.67 millimeters per second. At such lower tape speeds, one of the recording heads (R1–R4) will sweep a recorded segment, e.g., segments 42 and 43, of the magnetic tape 40. The different hatching of segments 42 and 43 in the illustration is intended to represent two different types of azimuth recording. Such alternating types of azimuth recording help in distinguishing between adjacent segments 42 and 43. A played-back segment sweep 44 results which has a more exaggerated recorded tilt angle from the perpendicular (across tape) than do segments 42 or 43. The difference in angles is an angle theta (θ). As the angle θ increases, the quality of the signal obtained from the played-back segment sweep 44 tends to degrade.

Consequently, it is advantageous to include playback heads in the drum head 12 that have a substantially wider playback width characteristic than characteristic recording width of the recording heads, e.g., twice as wide. It is also advantageous to make multiple sweeps 44 of each recorded segment 42 during playback at slightly different relative drum-head-to-magnetic-tape positions. For example, ten sweeps 44 distributed between successive segments 42 and 43 will provide good results. A best playback signal is selected from the several provided by the multiple playback sweeps of each recorded segment. The highest amplitude signal can be the basis of selection, or the one with the least detected errors. The best signal often represents a best-fit of the recording segment relative to the sweep of the playback head, such as the fit of sweep 44 shown in FIG. 2.

Two-channel azimuth recording with four heads is preferred, together with adjusted azimuth angle wider-width playback using two heads. For example, the recording heads R1 and R3 would be of the same azimuth type, and the recording heads R2 and R4 would be of a second azimuth type.

Figure 3:
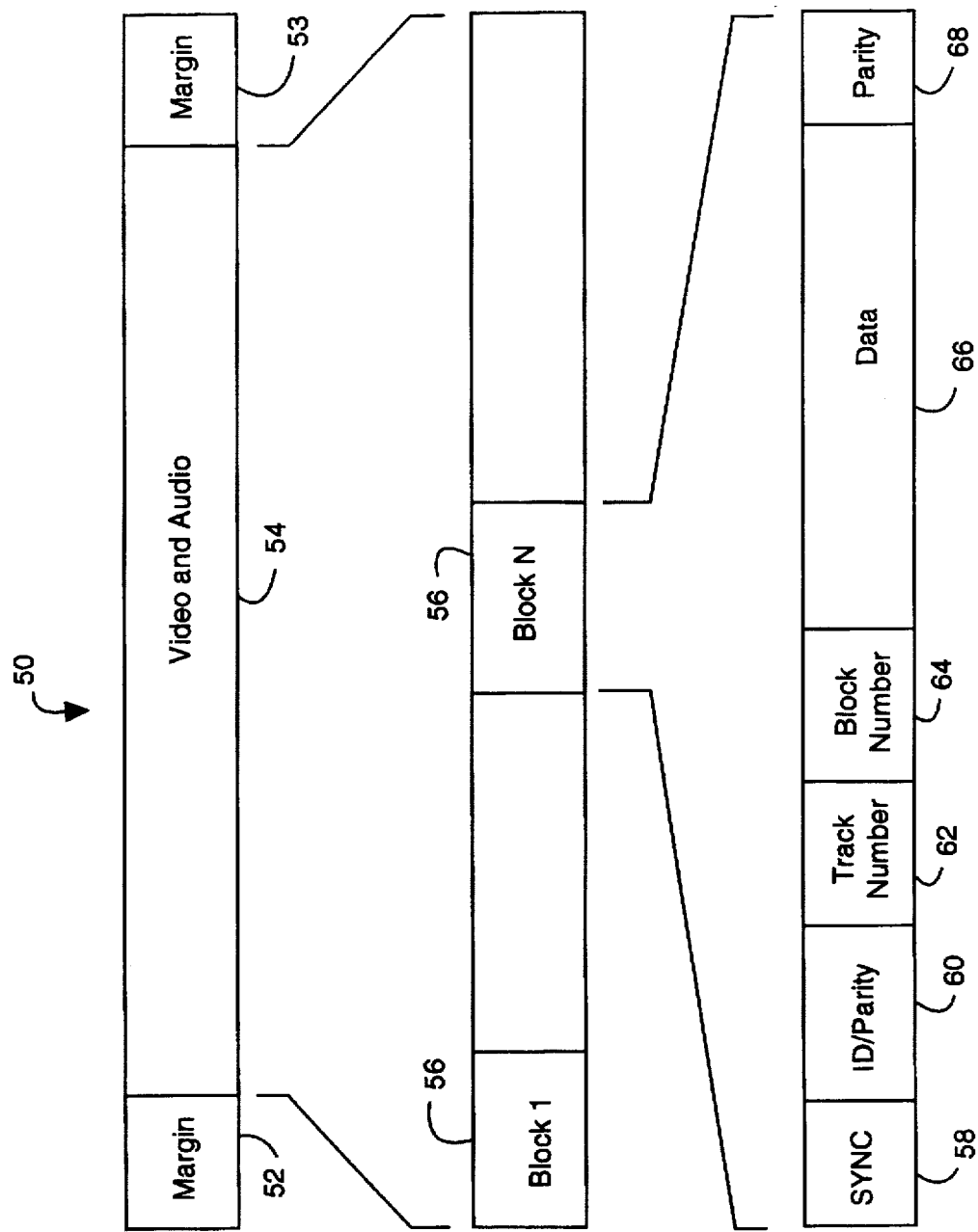
FIG. 3 is a diagram of the data format used in the magnetic tape recordings associated with FIGS. 1 and 2.

FIG. 3 shows a tape pattern format 50 that may be used for each recorded segment, such as segment 42. Each segment end which approaches the outside edges of the magnetic tape 40 has a pair of margins 52 and 54 that embrace between them a video and audio sector 54. Each video and audio sector 54 includes a plurality of blocks 56, which, in turn, each comprise a synchronization (SYNC) field 58, a block identification (ID) and parity field 60, a track number field 62, a block number field 64, a data field 66 and a block parity field 68. Data for recording on the tape 40 is pre-stored in the RAM 22 and recorded in the data field 66. Playback data is read from the data field 66 and stored in the RAM 30 after recovery.

In one implementation, half-inch oxide recording tape in VHS-type cassettes was used together with four digital recording heads, two digital playback heads and two analog recording/playback heads in the drum head 12. A recording track pitch of twenty-nine millimeters was used with a drum head rotation speed of 180° RPM (alternatively 1500 RPM). An input data rate of twenty megabits per second, and a recording rate in excess of forty megabits per second, yielded a playback data rate of one megabit per second. Double encoding using conventional Reed-Solomon code provides good results. Conventional, so-called "8–10" modulation was used. The recording tape speed was 33.35 millimeters per second and the playback speed was 1.67 millimeters per second. The analog portion of VCR 10 may comprise conventional "VHS-standard" components, e.g., tape transport and servo mechanisms.

Figure 4:
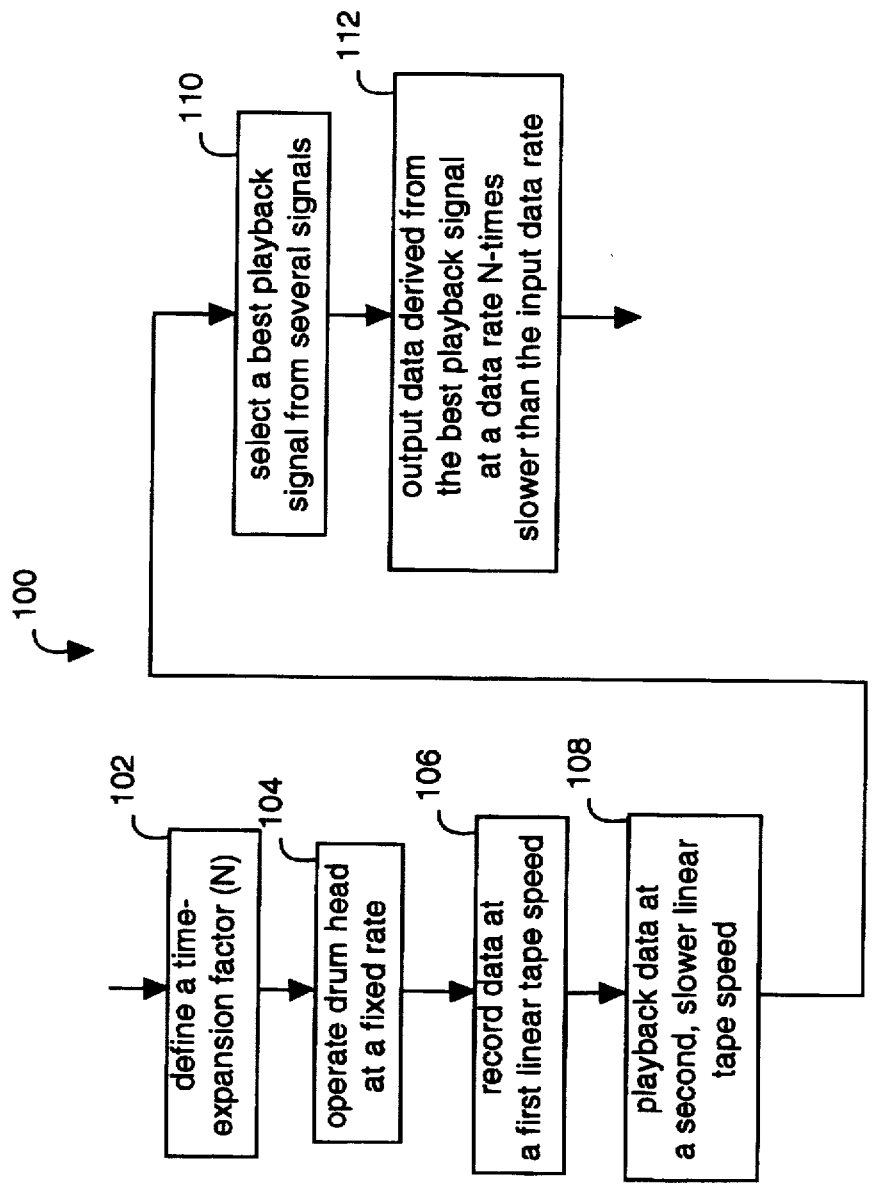
FIG. 4 is a flowchart of a method embodiment of the present invention.

A method embodiment of the present invention for recording and playing back data a substantially different rates with a video cassette recorder is illustrated as a method 100 in FIG. 4. A VCR having a capstan mechanism for pulling a magnetic tape spirally across a rotating drum head is used with the method 100, such as VCR 10. A step 102 defines a time-expansion factor (N) by dividing an input data rate by an output data rate. A step 104 operates the rotating drum head at a fixed rate. A step 106 records data received at the input data rate in a series of segments on the magnetic tape while operating the capstan mechanism at a first linear tape speed. A step 108 plays back the data recorded in the step 106 while operating the capstan mechanism at a second linear tape speed which is N-times slower than the first linear tape speed. A step 110 selects a best playback signal from a plurality of sets of playback signals (Q) obtained from multiple scans of each of the series of segments during the step 108. A step 112 outputs data derived from the best playback signal at a data output rate which is N-times slower than the input data rate.

In an alternative implementation of the method 100, the time-expansion factor (N) is equal to the number of the playback signals (Q) times the number of times a playback width of a playback head used in the step of playing back data exceeds a recording width of a recording head used in the step of recording data. In a second alternative implementation of the method 100, the time-expansion factor (N) is equal to twenty, the number of the playback signals (Q) obtained per one of the segments recorded is ten, and the number of times the playback width exceeds the recording width is two.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A video cassette recorder (VCR) for digital data time compression and expansion, comprising:
   a digital data input for receiving data at a first data rate;
   a digital data output for transmitting data at a second data rate which is substantially different than said first data rate, and that provides for digital data time compression and expansion;
   a fixed-speed rotating drum head with a plurality of recording heads and playback heads, and disposed within a video cassette recorder tape transport for writing and reading to and from a series of recorded segments on a magnetic tape;
   a two-speed capstan mechanism cooperative with the fixed-speed rotating drum head for moving said magnetic tape across said drum head at a first linear speed and at a substantially different second linear speed that supports said digital data time compression and expansion between the digital data input and output;
   recording means connected to the digital data input and the capstan mechanism for controlling said magnetic tape to move at said first linear speed during recording of said received data received at said first rate; and
   playback means connected to the digital data output and the capstan mechanism for controlling said magnetic tape to move at said second linear speed during playback of recorded data transmitted at said second rate;
   wherein, the playback means directs said playback heads to read each of said recorded segments on said magnetic tape a multitude of times before proceeding to a next recorded segment.

2. The VCR of claim 1, wherein:
   said receiving data rate exceeds said transmitted data rate by twenty times; and
   said first linear speed exceeds said second linear speed by twenty times.

3. The VCR of claim 1, wherein:
   the recording means includes two channels for azimuth recording of said magnetic tape and a random access memory for parsing said received data between said two channels.

4. The VCR of claim 1, wherein:
   the recording means includes data encoder means for error checking and correction (ECC); and
   the playback means includes data decoder means for error checking and correction (ECC).

5. The VCR of claim 1, wherein:
   the playback means further includes means for selecting a select one of said multiple reads by said playback heads to be connected to the digital data output; and
   said playback heads in the drum head have a playback width that is substantially twice the recording width of said recording heads.

6. A video cassette recorder (VCR), comprising:
   a digital data input for receiving data at a first data rate;
   a video cassette recorder tape transport and capstan mechanism having a fixed-speed drum head with a plurality of recording heads and playback heads, and a capstan for moving a magnetic tape across said drum head at a first linear speed and at a second linear speed which is twenty times slower than said first linear speed;
   a digital data output for transmitting data at a second data rate which is twenty times slower than said first data rate;
   recording means connected to the digital data input and the video cassette recorder tape transport and capstan mechanism for controlling said magnetic tape to move at said first linear speed during recording of said received data received at said first rate;
   azimuth recording means included in the recording means providing for two channels of azimuth recording of said magnetic tape and a random access memory for parsing said received data between said two channels; and
   playback means connected to the digital data output and the video cassette recorder tape transport and capstan mechanism for controlling said magnetic tape to move at said second linear speed during playback of recorded data transmitted at said second rate;
   wherein, the playback means directs said playback heads to read each of said recorded segments on said magnetic tape a multitude of times before proceeding to a next recorded segment.

7. A method of recording and playing back data at substantially different rates with a video cassette recorder having a capstan mechanism for pulling a magnetic tape spirally across a rotating drum head, the method comprising:
   defining a time-expansion factor (N) by dividing an input data rate by an output data rate;
   operating said rotating drum head at a fixed rate;
   recording data received at said input data rate in a series of segments on said magnetic tape while operating said capstan mechanism at a first linear tape speed;
   playing back data recorded in the step of recording while operating said capstan mechanism at a second linear tape speed which is N-times slower than said first linear tape speed;
   selecting a best playback signal from a plurality of sets of playback signals (Q) obtained from multiple scans of each of said series of segments during the step of playing back data; and
   outputting data derived from said best playback signal at a data output rate which is N-times slower than said input data rate.

8. The method of claim 7, wherein:
   said time-expansion factor (N) is equal to the number of said playback signals (Q) times the number of times a playback width of a playback head used in the step of playing back data exceeds a recording width of a recording head used in the step of recording data.

9. The method of claim 8, wherein:
   said time-expansion factor (N) is equal to twenty;
   said number of said playback signals (Q) obtained per one of said segments recorded is ten; and said number of times said playback width exceeds said recording width is two.

10. A video cassette recorder (VCR), comprising:

a digital data input for receiving data at a first data rate;

a video cassette recorder tape transport and capstan mechanism having a fixed-speed drum head with a plurality of recording heads and playback heads, and a capstan for moving a magnetic tape across said drum head at a first linear speed and at a second linear speed which is twenty times slower than said first linear speed;

a digital data output for transmitting data at a second data rate which is twenty times slower than said first data rate;

recording means connected to the digital data input and the video cassette recorder tape transport and capstan mechanism for controlling said magnetic tape to move at said first linear speed during recording of said received data received at said first rate;

azimuth recording means included in the recording means providing for two channels of azimuth recording of said magnetic tape and a random access memory for parsing said received data between said two channels; and playback means connected to the digital data output and the video cassette recorder tape transport and capstan mechanism for controlling said magnetic tape to move at said second linear speed during playback of recorded data transmitted at said second rate;

wherein, the playback means directs said playback heads to read each of said recorded segments on said magnetic tape a multitude of times before proceeding to a next recorded segment;

wherein, the recording means includes data encoder means for error checking and correction (ECC);

wherein, the playback means includes data decoder means for error checking and correction (ECC); and wherein, said playback heads in the drum head have a playback width that is substantially twice the recording width of said recording heads.

* * * * *